Nov. 20, 1945.  C. A. BROWN  2,389,134
FLOW CONTROL VALVE
Filed July 5, 1943

Inventor
Clyde A. Brown
by Parker & Carter
Attorneys.

Patented Nov. 20, 1945

2,389,134

UNITED STATES PATENT OFFICE 2,389,134

FLOW CONTROL VALVE

Clyde A. Brown, Chicago, Ill., assignor to The Dole Valve Company, Chicago, Ill., a corporation of Illinois Application July 5, 1943, Serial No. 493,530

4 Claims. (Cl. 138—45)

This invention relates to fluid flow control devices and has for its object to provide a new and improved device of this description.

The invention has as a further object to provide a fluid flow control device by means of which a constant rate of fluid flow through the device is secured, irrespective of the pressure variation of the fluid delivered to the flow control device.

The invention has a further object to provide a fluid flow control device which is simple in construction and operation, which controls the flow of the fluid with great accuracy, and which has no complicated parts to get out of order.

The invention has as a further object to provide a fluid flow control device which controls the fluid flow by means of a single member.

The invention has as a further object to provide a fluid flow control device which is simple in construction and operation, which controls the flow of the fluid with great accuracy, and which has no complicated parts to get out of order.

The invention has as a further object to provide a fluid flow control device which controls the fluid flow by means of a single member.

The invention has further objects which are more particularly pointed out in the accompanying description.

Referring now to the drawing wherein I have shown one form of device embodying the invention.

Like numerals refer to like parts throughout the several figures.

Figure 1:
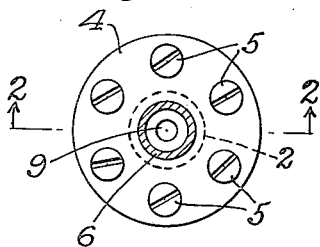
Fig. 1 is a plan view of the device as seen along the line 1—1 of Fig. 2.
Figure 3:
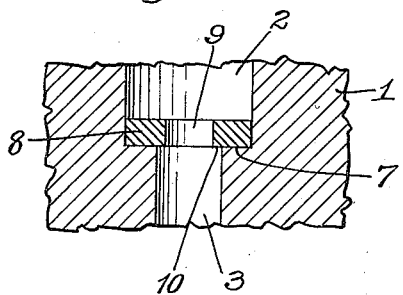
Fig. 3 is an enlarged sectional view similar to Fig. 2 with parts broken away and with the parts in the position they occupy when no fluid is passing through the device.
Figure 2:
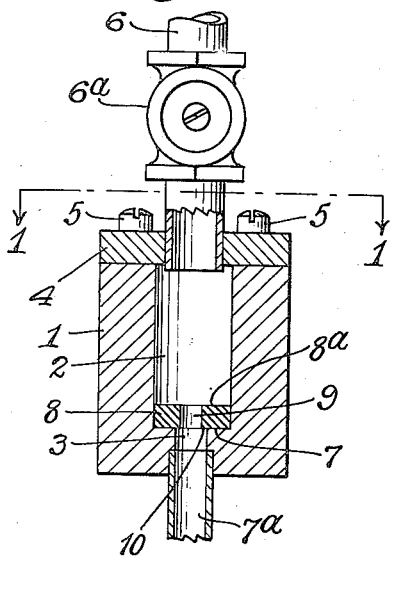
Fig. 2 is a sectional view taken along line 2—2 of Fig. 1 showing the position of the parts when no fluid is passing through the device.
Figure 4:
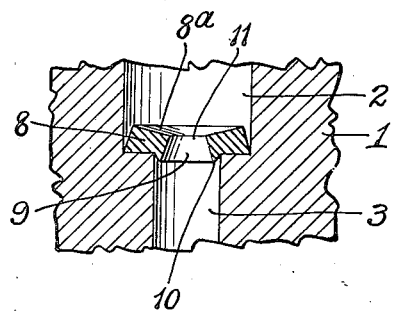
Fig. 4 is a view similar to Fig. 3 showing the position of the parts when fluid is passing through the device.

In the drawing I have shown a device for illustrating the general broad features of the construction, and I have not shown the device in connection with any particular apparatus to which the controlled fluid is to be delivered as the controlled fluid may be delivered to any apparatus where such control is necessary or desirable. In this construction there is provided a casing 1, which is of sufficient strength to stand the pressure of the fluid to be controlled. This casing is provided with a passageway extending therethrough having the enlarged portion 2 and the reduced portion 3. The casing is open at one end for the free admittance of the fluid. As herein shown, the casing is provided with a cover 4 fastened in position by the fastening devices 5. This cover has an opening therethrough to receive a delivery pipe 6, by means of which the fluid is delivered to the device. The pipe 6 is connected to the source of fluid supply and is provided with a suitable shut-off valve 6a. There is a ledge or shoulder 7 at the point where the enlarged portion 2 and the reduced portion 3 of the passageway meet, as clearly shown in Figs. 2, 3 and 4. There is a pipe 7a by means of which the device is connected to the apparatus to which the fluid is to be delivered.

Located within the enlarged portion 2 of the passageway and resting upon the shoulder 7 is a member 8 of elastic material, such as rubber or some of the substitutes for rubber, such as "neoprene," "sirvene" and the like. The member 8 has an opening 9 extending therethrough and which is smaller in cross-sectional area than the reduced section of the passageway through the casing. By having this hole 9 smaller than the reduced portion 3 of the passageway there is provided a projecting portion 10 of the member 8 which projects inwardly beyond the peripheral edge of the reduced portion 3 of the passageway through the device. When fluid is passed through the device the pressure of the fluid upon the upper face 8a of the member 8 causes the elastic material around the opening 9 to be distorted, a portion of it being pressed down into the reduced portion 3 of the passageway. This distortion of the material of the member 8 causes the portion 11 of the opening 9 in the face of said member upon which the pressure of the fluid is applied to be reduced in size or cross sectional area. This reduction in size increases as the pressure of the fluid on the surface of the member increases and decreases in size as the pressure of the fluid on the surface of the member decreases. By this means the effective opening through the member 8 is thus automatically varied by the pressure of the fluid delivered to the device so as to maintain a constant rate of flow through the device irrespective of the pressure of the fluid delivered to the device.

The use and operation of my invention is as follows. In assembling the device the cover 4 is removed and the member 8 of elastic material with the opening therethrough is placed into the enlarged portion 2 of the passageway extending through the device. The cover is then placed in position and the pipe 6 connected into the pipe leading to the source of supply of the fluid to be used and the pipe 7a connected to the device receiving this fluid. The valve 6a is then opened and the fluid passes into the enlarged portion 2 of the passageway through the casing 1 and the pressure thereof on the face 8a of the member 8 distorts this member and causes a portion 10 thereof to be forced down into the decreased portion 3 of the passageway thereby causing the upper portion 11 of the opening 9 to be decreased in size so as to reduce the amount of fluid passing through the opening 9. This decrease in size is responsive to the increase in pressure of the fluid so that the effective opening through the member 8 is automatically controlled to maintain a constant rate of fluid flow through the device regardless of the variation in pressure of the fluid delivered to the device. It will thus be seen that there is here provided a fluid flow control device with a discharge opening, the size of which is varied inversely as the pressure of the fluid delivered to the device varies, thereby maintaining a constant rate of fluid delivery from the device, regardless of variations in the pressure of the incoming fluid.

I have described the device and the use thereof but it is, of course, understood that the device can be used for different purposes to secure difference results. The device may be used under conditions where other than a constant flow is required. The relative sizes of the parts and the openings and the passageway can, of course, vary to meet the conditions required. I, therefore, do not limit myself to the particular construction shown.

I claim:

1. A fluid control device comprising a casing having a passageway extending therethrough, a shoulder in said passageway facing the upstream side thereof and extending radially inwardly from the side wall thereof, an elastic member seated on said shoulder and extending substantially into engagement with said side wall, said member having an orifice therethrough in a region of said member spaced inwardly of the inner edge of said shoulder to provide for flexing of the central portion of said member in a downstream direction upon flow of fluid through said orifice and whereby the opening in said member forming said orifice is enlarged on the downstream side and decreased in area on the upstream side.

2. A fluid flow control device comprising a casing having a passageway extending therethrough formed in two sections, an enlarged section and a reduced section, and having a shoulder at the point where the two sections connect, a relatively thin elastic member fitting in the enlarged section of the passageway and substantially in contact with the walls thereof and engaging said shoulder, said elastic member comprising an apertured disk, the aperture thereof being located an appreciable distance radially inwardly of said shoulder to provide for downward flexing of the central portion of the elastic member, whereby the opening is enlarged on the downstream side and decreased in area on the upstream side upon the flow of fluid therethrough.

3. A fluid control device comprising a casing having a passageway therein, a shoulder in said passageway facing the inlet side of the passageway and extending radially inwardly from the side wall of the casing, an elastic member seated on said shoulder so as to extend radially toward the wall of said casing and having its outer periphery substantially radially confined beyond said shoulder so that the incoming fluid acts endwise against the member, said member having an orifice therethrough in a region of said member spaced inwardly of the radially inner edge of said shoulder to provide for flexing of the central portion of said member in a direction toward the outlet side of said passageway upon flow of fluid through said orifice, the opening in said member forming said orifice being enlargeable on the outlet side of the passageway and decreasable in the area on the inlet side of the passageway in response to the pressure of the fluid acting endwise against said member.

4. The device of claim 3 further characterized by the deflected central portion of the elastic member on the outlet side being substantially of a frusto-conical contour.

CLYDE A. BROWN.